March 29, 1955          G. C. BELL          2,705,025
LOOM PICKER AND PICKER STICK
Filed Oct. 6, 1953
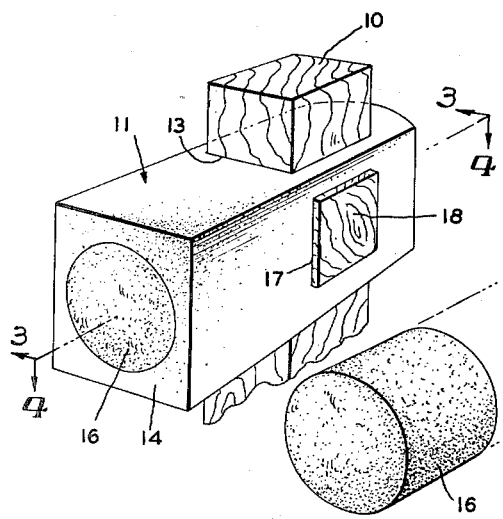
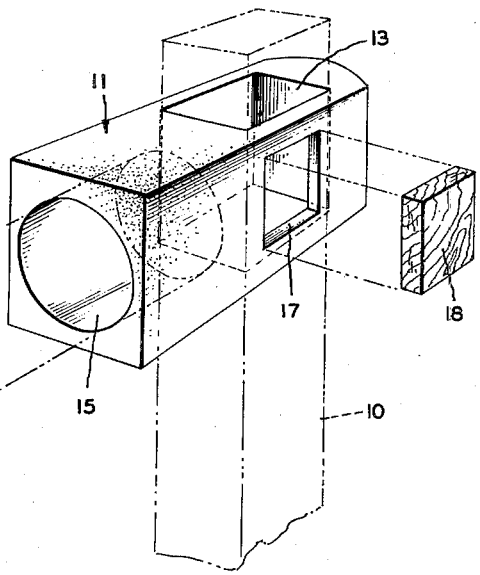
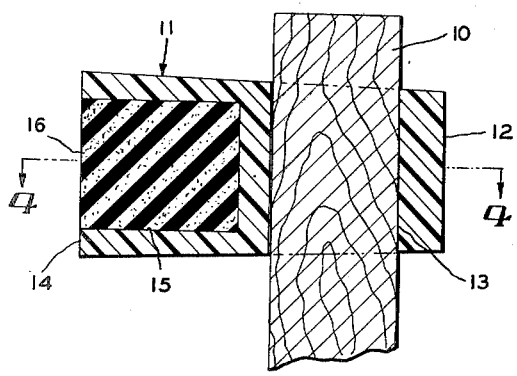
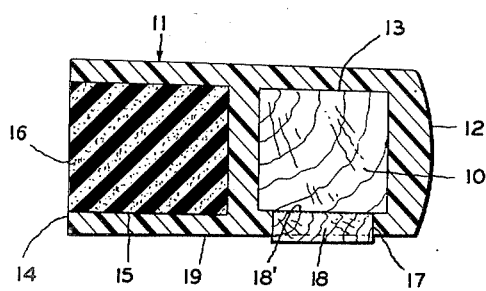
INVENTOR
George Clarence Bell
BY
ATTORNEY

United States Patent Office 2,705,025
Patented Mar. 29, 1955

2,705,025
LOOM PICKER AND PICKER STICK

George C. Bell, Greenwood, S. C.

Application October 6, 1953, Serial No. 384,412

3 Claims. (Cl. 139—159)

My invention relates to improvements in loom pickers or shuttle drivers.

A primary object of the invention is to provide a loom picker, embodying novel and simplified means for attaching the same to the picker stick, and enabling the picker to remain parallel or true upon the picker stick for proper engagement with the shuttle.

A further important object of the invention is to provide a picker and picker stick connection adapted to prolong the useful life of the picker stick, and eliminating entirely the necessity for screws or other attaching elements which normally penetrate the picker stick, and in time destroy the same.

A further object is to provide means for positively locking or keying the picker to the picker stick, so that when once assembled, the picker is absolutely immovable, and remains properly adjusted relative to the picker stick, thereby assuring proper engagement with the shuttle.

A still further object is to provide a picker and picker stick connection which is extremely strong and durable.

Other objects and advantages of the invention will be apparent during the course of the following description.

In the accompanying drawings, forming a part of this application, and in which like numerals are employed to designate like parts throughout the same, Figure 1 is a fragmentary perspective view of a picker and picker stick embodying my invention, Figure 2 is an exploded perspective view of the same with the picker stick shown in broken lines for the purpose of clarification, Figure 3 is a central vertical section taken on line 3—3 of Figure 1, and, Figure 4 is a horizontal section taken on line 4—4 of Figure 3.

In the drawings, where for the purpose of illustration is shown a preferred embodiment of my invention, the numeral 10 designates a picker stick of conventional construction, rectangular in cross-section, and formed of wood.

A picker 11 formed of hard rubber, fiber, plastics material, or the like is provided, and the picker 11 is in the form of a somewhat elongated generally rectangular block or body portion, preferably square or rectangular in transverse cross-section, and preferably tapering somewhat toward its rear end nearest the picker stick 10.

The picker 11 is provided near and forwardly of its rear end 12 with a rectangular opening 13 extending through the top and bottom of the same, and forming a socket for the rectangular picker stick 10, as shown. When applied to the picker stick, the picker 11 is arranged at right angles thereto, and has its forward or leading end 14 spaced a substantial distance forwardly of the forward side of the picker stick, as shown.

The picker 11 may be provided in its forward end, if desired, with a suitable recess 15, adapted to receive and hold a picker cushion 16 of any preferred material such as hard rubber, fibrous material or the like. If preferred, the recess 15 and cushion 16 may be omitted entirely.

The picker 11 is provided in one side with a rectangular opening 17 of generous proportions, and opening into the socket opening 13, centrally thereof, and intersecting the socket opening 13 at right angles. When the picker 11 is applied to the picker stick 10 in the manner shown, a rectangular portion of one side of the picker stick lies adjacent to the opening 17 and is exposed by the opening. The picker stick 10 may extend somewhat above the picker 11 in assembly, and the picker stick preferably entirely fills the socket opening 13 and preferably has a fairly snug fit therein.

In order to positively lock or key the picker 11 to the picker stick 10, I provide a rectangular wooden block or plug 18, adapted to enter the opening 17 and bear against the adjacent exposed side of the picker stick 10. The block or plug 18 preferably has a snug fit within the opening 17, and is preferably of substantially the same thickness as the sidewall of the picker 11 at the opening 17. With this arrangement, the block 18 when placed within the opening 17 will not project appreciably beyond the adjacent side surface 19 of the picker, and forms no objectionable obstruction or projection, likely to catch and break the filling. I prefer to make the outer face of the plug 18 substantially flush with the side face 19 of the picker, as indicated.

When the picker 11 is applied to the picker stick 10 and properly adjusted longitudinally thereof, the block or plug 18 is introduced into the opening 17, and permanently rigidly secured to the adjacent side of the picker stick 10 with quick drying wood glue 18', or the like. When the glue dries, the block 18 serves to positively key or lock the picker 11 in its proper adjusted position upon the picker stick, and assures that the same remains immovable and true during the subsequent operation of the loom. Due to the rectangular shape of the block 18, the picker 11 is held against vertical and endwise movement upon the picker stick, and with the rectangular socket opening 13, the block 18 serves to rigidly hold the picker in proper alignment at all times.

It is to be noted that my arrangement eliminates entirely the necessity for screws, set screws, nails and the like, which are frequently driven into picker sticks when attaching the picker thereto. Such penetrating fastener elements ultimately render the picker stick useless, and the same must be replaced with a new picker stick. With my construction, the useful life of both the picker stick and picker is greatly prolonged, and my construction is highly simplified, compact, durable and trouble-free.

It is to be understood that the form of the invention herewith shown and described is to be taken as a preferred embodiment of the same, and that various changes in the shape, size and arrangement of parts may be resorted to, without departing from the spirit of the invention or scope of the subjoined claims.

Having thus described my invention, I claim:

1. In a loom, a wooden picker stick having sides, a picker having ends and sides and having an upstanding opening formed therein which extends through its top and bottom and is spaced from said ends, one picker side having an opening formed therein and leading into the upstanding opening, the picker stick being mounted within the upstanding opening, and a wooden plug held within the picker side opening, the picker side opening and plug having a shape which holds the plug against turning with respect to the picker, and an adhesive immovably securing the inner face of the plug to the adjacent side of the picker stick, the inner face of the plug extending longitudinally of the path of travel of the picker stick.

2. In a loom, a picker stick having sides, a picker having ends and sides and having an upstanding opening formed therein which extends through its top and bottom and is spaced from said ends, one picker side having a relatively large opening formed therein and leading into the upstanding opening and extending over the major portion of the area of the adjacent side of the upstanding opening, said opening being non-circular, the picker stick being mounted within the upstanding opening, and a plug fitting snugly within the picker side opening and corresponding in shape thereto, the plug being held against turning movement with respect to the picker, and an adhesive immovably securing the inner face of the plug to the adjacent side of the picker stick, the inner face of the plug extending longitudinally of the path of travel of the picker stick.

3. In a loom, a picker having ends and sides and having an upstanding opening formed therein which extends through its top and bottom and is spaced from said ends, one picker side having a relatively large rectangular opening formed therein leading into the upstanding opening and extending throughout the major portion of the side of such upstanding opening, the upstanding opening being adapted to receive a picker stick, and a rectangular plug fitting snugly within the rectangular opening, and an adhesive immovably securing the inner face of the plug to the adjacent side of the picker stick, the inner face of the plug extending longitudinally of the path of travel of the picker stick.

References Cited in the file of this patent

UNITED STATES PATENTS

| | | |
|---|---|---|
| 849,632 | Lemoine | Apr. 9, 1907 |
| 2,045,724 | Rea | June 30, 1936 |